(No Model.)

R. G. CHENEY.
AUTOMATIC POWER WINDLASS.

No. 301,863. Patented July 15, 1884.

WITNESSES:
Thos. Houghton.
W. X. Stevens

INVENTOR:
Reuben G. Cheney
BY Munn & Co.
ATTORNEYS.

UNITED STATES PATENT OFFICE.

REUBEN G. CHENEY, OF ATCHISON, KANSAS.

AUTOMATIC POWER-WINDLASS.

SPECIFICATION forming part of Letters Patent No. 301,863, dated July 15, 1884.

Application filed February 16, 1884. (No model.)

*To all whom it may concern:*

Be it known that I, REUBEN G. CHENEY, a citizen of the United States, residing at Atchison, in the county of Atchison and State of Kansas, have invented certain new and useful Improvements in Automatic Windlasses, of which the following is a description.

This invention relates to that class of automatic windlasses in which a shaft and a clutch thereon are constantly revolved in one direction by power, and a spool is fitted loosely on the said shaft, to be engaged by the clutch at the will of the operator, to wind upon the spool the rope of the windlass.

The object of my invention is to engage the spool with the revolving clutch by a positive motion that will not cause too sudden a shock in starting, to disengage the spool at the proper time, and to properly adjust the device for holding the spool disengaged.

To this end my invention consists in the construction and combination of parts forming a windlass, hereinafter described and claimed, reference being had to the accompanying drawings, in which—

Figure 1:
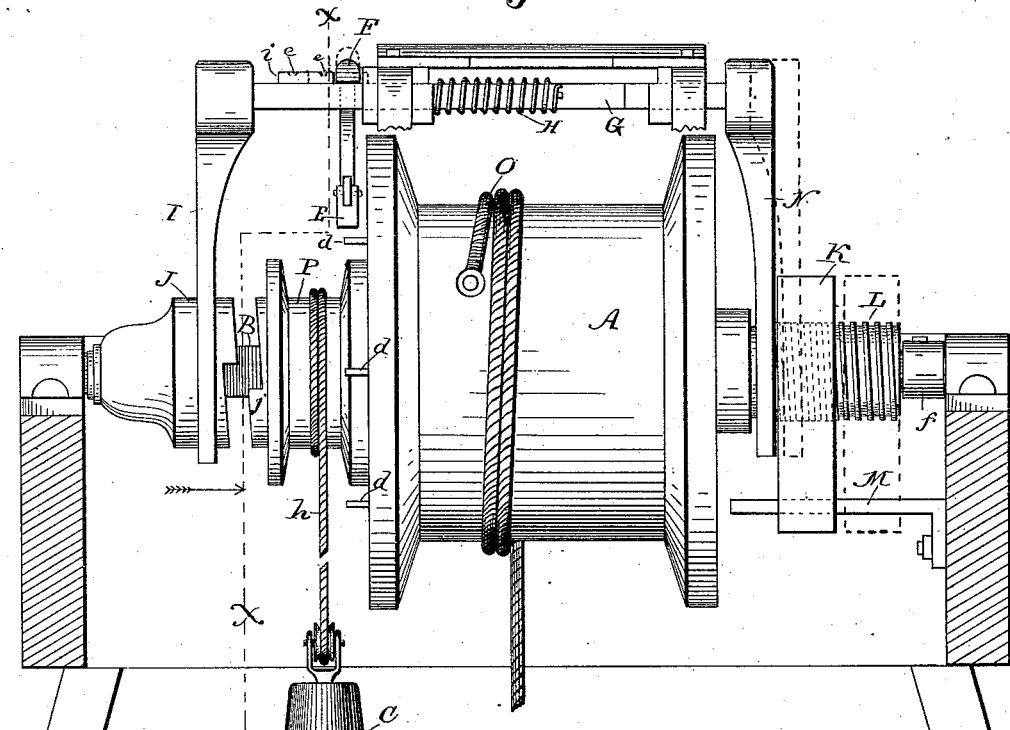
Figure 2:
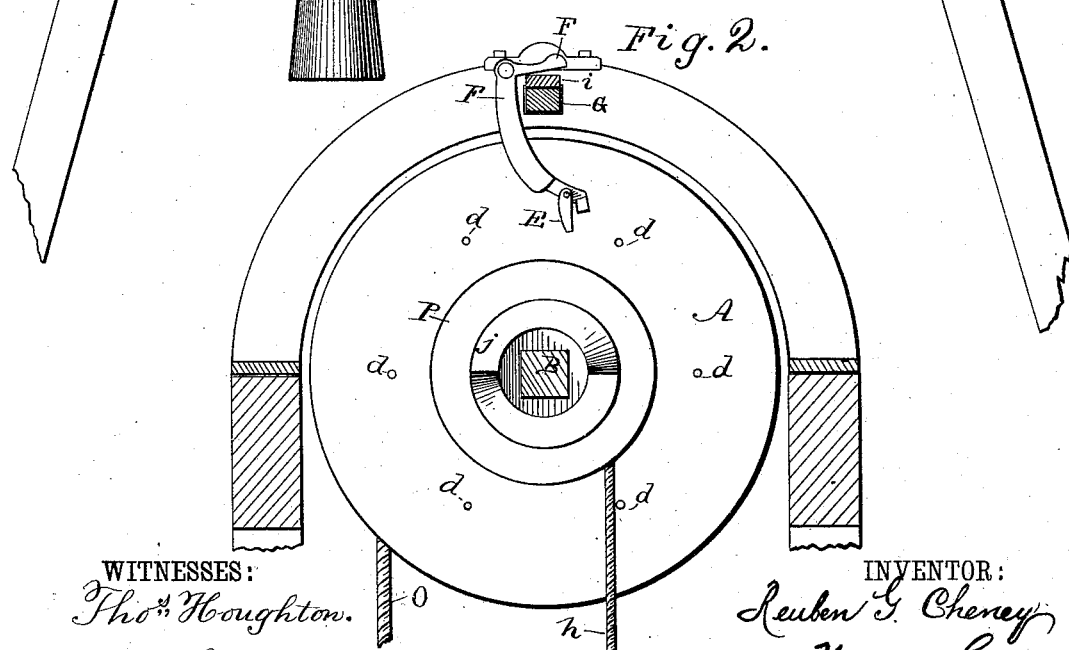

Figure 1 is a side elevation of my invention, part broken away; and Fig. 2 is a transverse vertical section at $x\ x$ of Fig. 1.

A represents the spool loosely mounted upon its shaft, having attached to it the windlass-rope O, to be wound thereon in doing work. The rope O may carry a shovel or other receptacle adapted to scoop up a load of grain from a quantity carried loosely in bulk. At one end of pulley A, and firmly secured as a part thereof, is a smaller pulley, P, upon which a rope, $h$, is wound by the act of unwinding the rope O.

C is a weight attached to rope $h$.

B is the main shaft, which is kept constantly revolving in one direction by any suitable power.

J is a clutch placed on a squared portion of shaft B, to revolve therewith, but free to be slid endwise thereon.

$j$ is a clutch-jaw on the spool, adapted to be engaged by the jaw of clutch J.

G is the shifter-bar, provided with two forked arms, I and N. The fork of arm I engages a groove in the clutch J. The fork of arm N straddles a screw, L, which latter is on a hub of the spool A.

K is a screw-nut engaging screw L, and fitted to slide on a guide-bar, M, which is fixed in the frame to keep the nut from revolving with the screw.

H is a spring acting continually on the shifter-bar G to force the clutch J into engagement with the spool.

$i$ is a stop-block fixed to the shifter-bar by means of set-screws $e$, so that the block may be adjusted longitudinally on the bar.

F is a latch adapted to fall across the path of the stop-block, thereby preventing the spring H from forcing the clutch into engagement. The latch F is an elbow-lever having a tappet, E, pivoted to its lower arm to swing in the path of pins $d$, which are fixed in the spool A. The tappet is free to swing out of the path of the pins when hit by them in the act of unwinding the rope O from the spool; but when the spool starts to wind the rope O the first pin which hits the tappet will disengage the latch F from block $i$, leaving the clutch to engage the spool and continue said winding. This is accomplished as follows: When the scoop is drawn down by the hands of the operator to be filled, the weight C is wound up, and at the same time nut K is fed outward toward collar $f$. When the scoop is full, the rope O is drawn a little slack and then set free, when the weight C will start the spool to wind up the slack rope, and in so doing it causes a pin, $d$, to raise latch F and engage the clutch. As the spool was already started forward, the action of the clutch gives no shock to the machinery. When the spool starts, it begins to draw the nut $k$ by means of the screw L toward the forked arm N. When the nut strikes the arm, it slides the bar G until the clutch J is disengaged from the spool. At this instant the block $i$ passes from under the latch F, allowing the latter to engage the former, thus holding the clutch J, disengaged. Now, the scoop and its rope O are withdrawn to take another load, thus unwinding the spool A, thereby returning the nut K to its starting-point on the screw L.

$f$ is a collar secured to the shaft B, serving as a bearing for the end of the spool.

What I claim as my invention, and desire to secure by Letters Patent, is—

1. The combination, with a rotary shaft, B, a clutch, J, having longitudinal movement thereon, but fixed to revolve therewith, a spool, A, mounted to revolve on the shaft, a screw, L, on a hub of the spool, and a nut, K, fitted to engage the screw L, of a shifter-bar, G, having forked arms I and N, adapted to engage the clutch J and nut K, respectively, a latch, F, and a stop-block, $i$, on bar G, substantially as shown and described.

2. The combination, with the shaft, the clutch, and the shifting-bar described, of the spool A, provided with the rope O, pins $d$, screw L, and spool P, the weight C, and rope $h$, winding opposite to rope O, the screw-nut K, the block $i$ on the shifting-bar, and the latch F, provided with the tappet E, as shown and described.

REUBEN G. CHENEY.

Witnesses:
EUGENE S. ROLFE,
CHARLES G. ROLFE.